(12) United States Patent
Ma et al.

(10) Patent No.: US 9,124,086 B2
(45) Date of Patent: Sep. 1, 2015

(54) FAILSAFE ESD PROTECTION

(75) Inventors: Wei Yu Ma, Taitung (TW); Kuo-Ji Chen, Taipei (TW)

(73) Assignee: Taiwan Semiconductor Manufacturing Company Limited, Hsin-Chu (TW)

( * ) Notice: Subject to any disclaimer, the term of this patent is extended or adjusted under 35 U.S.C. 154(b) by 253 days.

(21) Appl. No.: 13/557,520

(22) Filed: Jul. 25, 2012

(65) Prior Publication Data

US 2014/0029142 A1    Jan. 30, 2014

(51) Int. Cl.
*H02H 9/04* (2006.01)

(52) U.S. Cl.
CPC *H02H 9/04* (2013.01); *H02H 9/046* (2013.01)

(58) Field of Classification Search
USPC ................................. 361/56, 57, 58
See application file for complete search history.

(56) References Cited

U.S. PATENT DOCUMENTS

| | | | |
|---|---|---|---|
| 5,448,198 A * | 9/1995 | Toyoshima et al. | 327/530 |
| 5,736,777 A * | 4/1998 | Shield et al. | 257/529 |
| 5,959,820 A * | 9/1999 | Ker et al. | 361/111 |
| 6,614,262 B2 * | 9/2003 | Kunz et al. | 326/81 |
| 2001/0017755 A1 * | 8/2001 | Toyoshima | 361/56 |
| 2002/0006045 A1 * | 1/2002 | Shirai et al. | 363/17 |
| 2002/0130366 A1 * | 9/2002 | Morishita | 257/360 |
| 2004/0212936 A1 * | 10/2004 | Salling et al. | 361/56 |
| 2004/0257728 A1 * | 12/2004 | Hu | 361/56 |
| 2005/0237681 A1 * | 10/2005 | Chen | 361/56 |
| 2009/0091871 A1 * | 4/2009 | Hung | 361/56 |
| 2009/0200803 A1 * | 8/2009 | Ichinose et al. | 290/44 |
| 2010/0265622 A1 * | 10/2010 | Campi et al. | 361/56 |
| 2012/0075757 A1 * | 3/2012 | Chen | 361/56 |

* cited by examiner

*Primary Examiner* — Thienvu Tran
*Assistant Examiner* — Angela Brooks
(74) *Attorney, Agent, or Firm* — Cooper Legal Group, LLC (57) ABSTRACT

Among other things, one or more techniques and/or systems for providing failsafe electrostatic discharge (ESD) protection are provided. In one embodiment, ESD protection is provided by connecting a voltage fail safe (VFS) supply voltage to an NWELL circuit interface (e.g., of a PMOS transistor) and connecting PAD to at least one of VFS or the NWELL circuit interface. To this end, circuitry to be protected from ESD (e.g., circuitry operably connected to PAD) is provided with failsafe ESD protection (e.g., such that a non-snapback NMOS device may be utilized to discharge ESD current, where a non-snapback NMOS generally consumes less semiconductor real estate and is less complex to produce as compared to a snapback NMOS), for example. In this manner, failsafe ESD protection is efficiently provided.

20 Claims, 9 Drawing Sheets

FAILSAFE ESD PROTECTION

BACKGROUND

Generally, electrostatic discharge (ESD) networks comprise, among other things, an ESD current path, control circuits (e.g., switches, floating well circuits, and/or pull-up gate circuits), and/or a self-protection pull-down device (e.g., designed to mitigate leakage current). For example, a snapback NMOS may be used as a pull down device and/or an ESD current path within an ESD network. However, a snapback NMOS device generally requires an extended drain region such that gate to gate spacing of the snapback NMOS is larger than desired (e.g., greater than one micro-meter), for example. Larger gate to gate spacing generally occupies a greater amount of space on a device, which may be undesirable (e.g., at least because model accuracy may be reduced and/or fewer transistors may be fabricated on a die and/or device, for example). Additionally, parasitic resistances associated with the extended drain region may be introduced (e.g., and/or undesirable). Moreover, snapback NMOS devices are generally more difficult to fabricate (e.g., by comparison with non-snapback NMOS devices), for example. That is, for example, drain extension, resist protective oxide (RPO), and/or additional implanting (e.g., epitaxial) may be required to fabricate a snapback NMOS. Furthermore, layout styles associated with drain extension generally degrades process yield, thus requiring a special process to fabricate the snapback NMOS accordingly.

SUMMARY

This summary is provided to introduce a selection of concepts in a simplified form that are further described below in the detailed description. This summary is not intended to be an extensive overview of the claimed subject matter, identify key factors or essential features of the claimed subject matter, nor is it intended to be used to limit the scope of the claimed subject matter.

Among other things, one or more techniques and/or systems for providing failsafe electrostatic discharge (ESD) protection are provided. In one embodiment, ESD protection is provided by connecting a voltage fail safe (VFS) supply voltage to an NWELL circuit interface (e.g., of a PMOS device) and connecting PAD to at least one of VFS or the NWELL circuit interface. To this end, circuitry to be protected from ESD (e.g., circuitry operably connected to PAD) is provided with failsafe ESD protection. In one embodiment, an ESD clamp connects VFS to a negative supply voltage (VSSA) of a chip (e.g., Chip "A" comprising the circuitry to be protected). According to one aspect, PAD is connected to VFS via a first diode. Another aspect provides for a connection from VSSA to PAD via a second diode (e.g., such that a non-snapback NMOS device may be utilized to discharge ESD current), for example. To this end, ESD current entering through PAD is discharged through VFS. In this manner, failsafe ESD protection is provided.

To the accomplishment of the foregoing and related ends, the following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DESCRIPTION OF THE DRAWINGS

Aspects of the disclosure may be understood from the following detailed description when read with the accompanying drawings. It will be appreciated that elements and/or structures of the drawings may not necessarily be drawn to scale. Accordingly, the dimensions of the various features may be arbitrarily increased and/or reduced for clarity of discussion.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Generally, self protection pull down devices (e.g., such as snapback NMOS transistors) are required for electrostatic discharge (ESD) networks to form a path where ESD current may be discharged, for example. However, snapback NMOS devices require drain extension (e.g., such that a drain region for the snapback NMOS is larger than a drain region for a non-snapback NMOS).

For example, gate to gate spacing on a snapback NMOS may be larger (e.g., greater than 1.2 um, for example), while gate to gate spacing on a conventional NMOS may be smaller (e.g., around 0.6 um, for example). That is, a snapback NMOS may consume on the order of fifty percent more valuable semiconductor real estate that than a non-snapback NMOS. A larger gate to gate spacing may impact circuit density (e.g., degrading process yield in a negative manner at least because fewer devices and/or transistors may be fabricated on a limited space, such as a die, for example). Additionally, a drain ballistic resistor, resist protective oxide (RPO), and/or additional implanting (e.g., epitaxial) may be required to fabricate the snapback NMOS accordingly, which may consume time and resources in a semiconductor fabrication process, for example.

Figure 1:
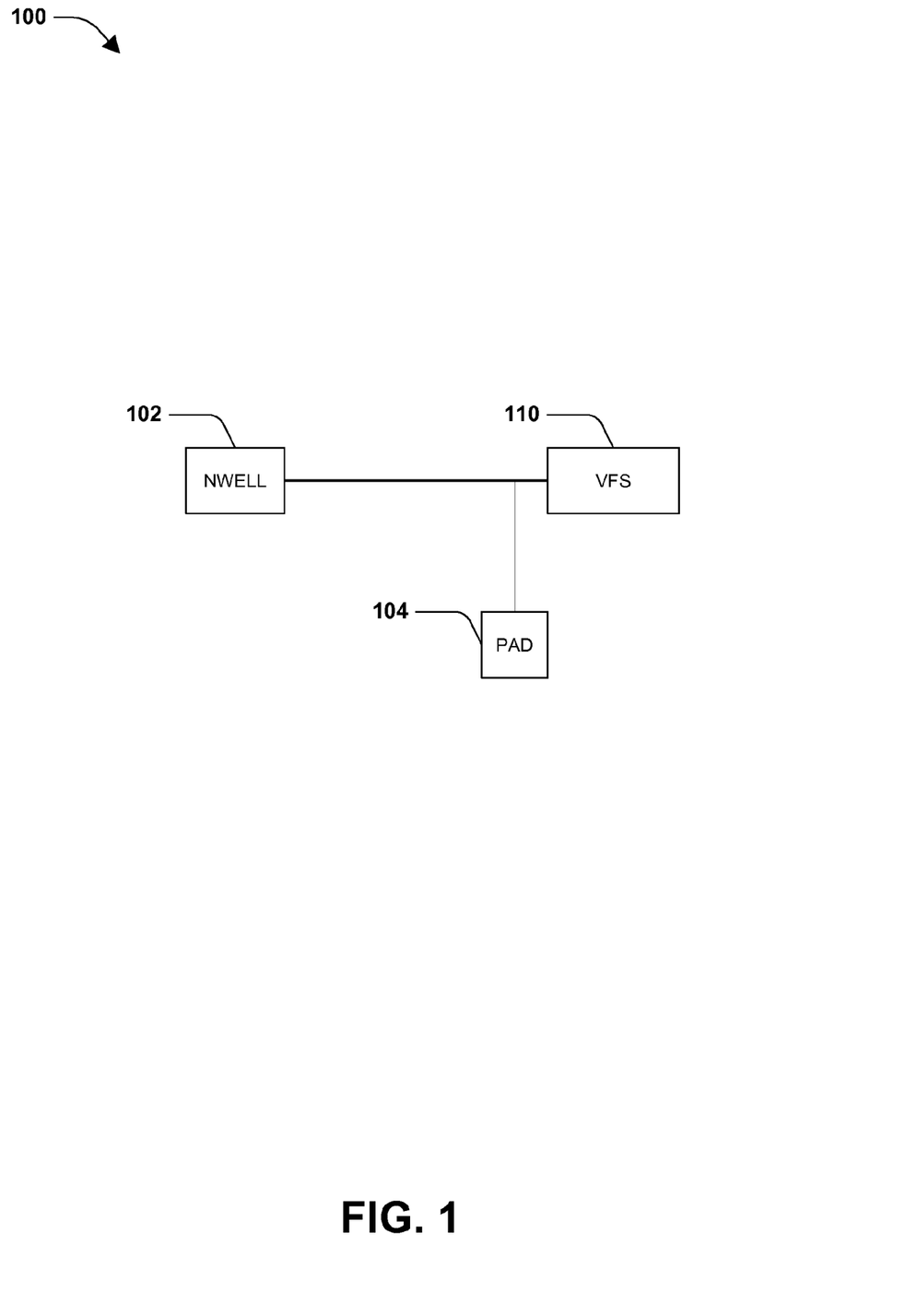
FIG. 1 is a schematic of an example failsafe ESD network.

FIG. 1 illustrates a schematic of an example failsafe ESD network 100 which does not implement a snapback NMOS and thus avoids associated drawbacks. In one embodiment, ESD network 100 comprises an NWELL circuit interface 102, a voltage fail safe (VFS) 110 (e.g., a supply voltage), and PAD 104. A PMOS device (e.g., a PMOS transistor) may comprise NWELL circuit interface 102, such that a body of the PMOS device comprises the NWELL circuit interface 102, for example. Generally, a failsafe ESD network enables a first chip to toggle (e.g., power down a first Chip "A" and power up a second Chip "B") in a manner such that leakage current into the first chip is mitigated during the toggling, for example. According to one aspect, VFS 110 is a supply voltage for the NWELL circuit interface 102 of the PMOS device. In one embodiment, PAD 104 is electrically connected to PAD on a chip (e.g., for a signal pin, for example). PAD 104 is generally connected to a pin and/or a ball grid array external to chip packaging to facilitate communication between a chip (e.g., Chip "A") and other integrated circuits (ICs), for example. In one embodiment, VFS110 is connected to the NWELL circuit interface 102, and PAD 104 is connected to VFS 110. It will be appreciated that in other embodiments, PAD 104 may be connected to NWELL circuit interface 102. According to one aspect, VFS 110 enables MOS gate to gate spacing to be reduced (e.g., such that the gate to gate spacing in NMOS devices is less than 0.6 micro-meters and/or such that snapback NMOS requirements are mitigated, for example). Accordingly, such ESD networks provide ESD protection while being process friendly (e.g., easier, less complex, etc. to fabricate). To this end, an example failsafe ESD network 100 configured to exhibit a higher circuit quality is provided.

Figure 2:
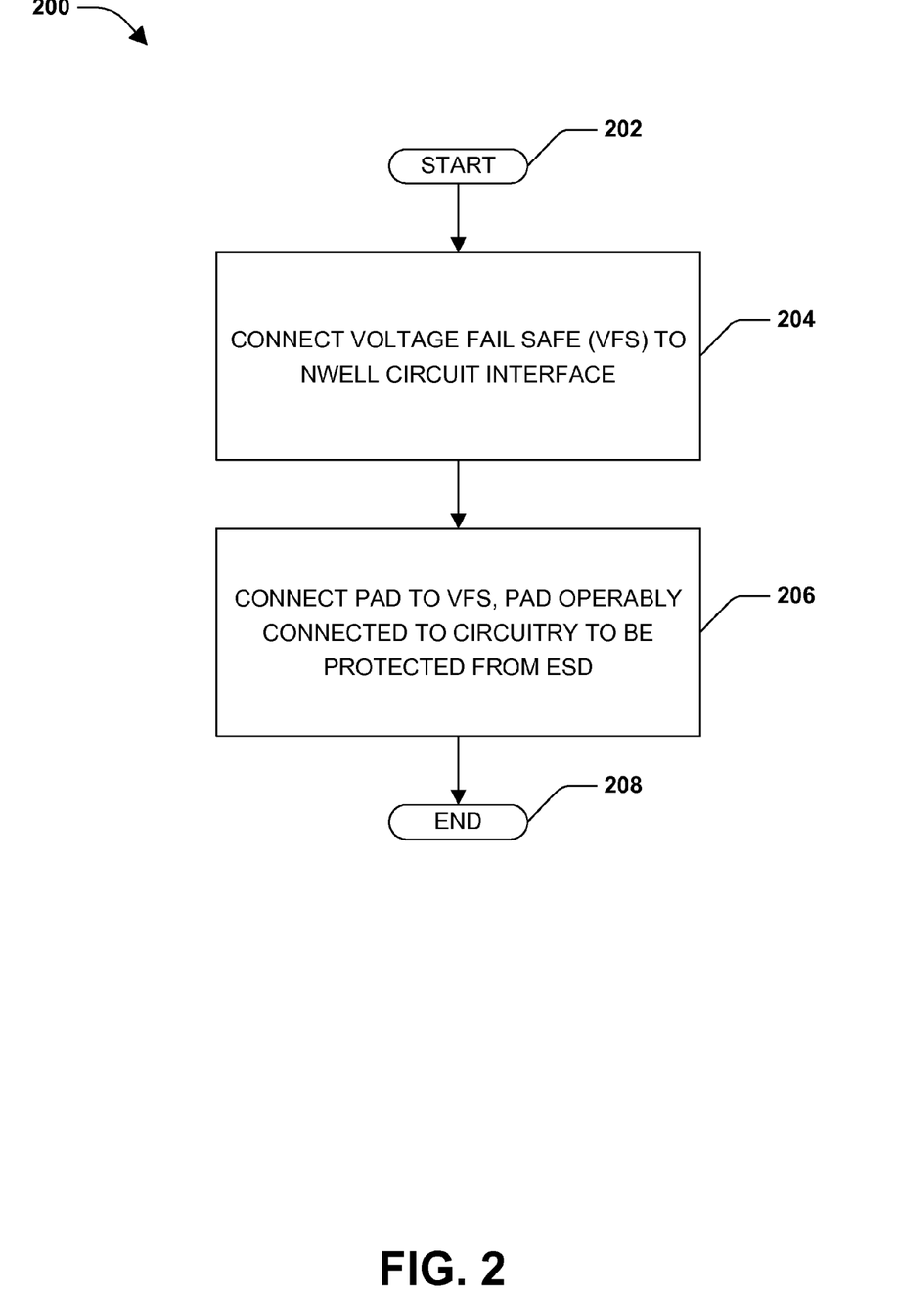
FIG. 2 is a flow diagram of an example method for providing failsafe ESD protection.

FIG. 2 illustrates a flow diagram of an example method 200 for providing failsafe ESD protection. At 202, the method starts. At 204, a voltage fail safe (VFS) supply voltage is connected to an NWELL circuit interface. In one embodiment, VFS is connected to a PMOS device (e.g., a body of a PMOS transistor) comprising the NWELL circuit interface. According to one aspect, the PMOS device may comprise a pull up driver. At 206, PAD is connected to VFS, and PAD is generally operably connected to circuitry to be protected from ESD (e.g., an ESD event, for example). In one embodiment, VFS is connected to the NWELL and/or the body of the PMOS device, and a drain of the PMOS device is connected to PAD. The method 200 then ends at 208.

Figure 3:
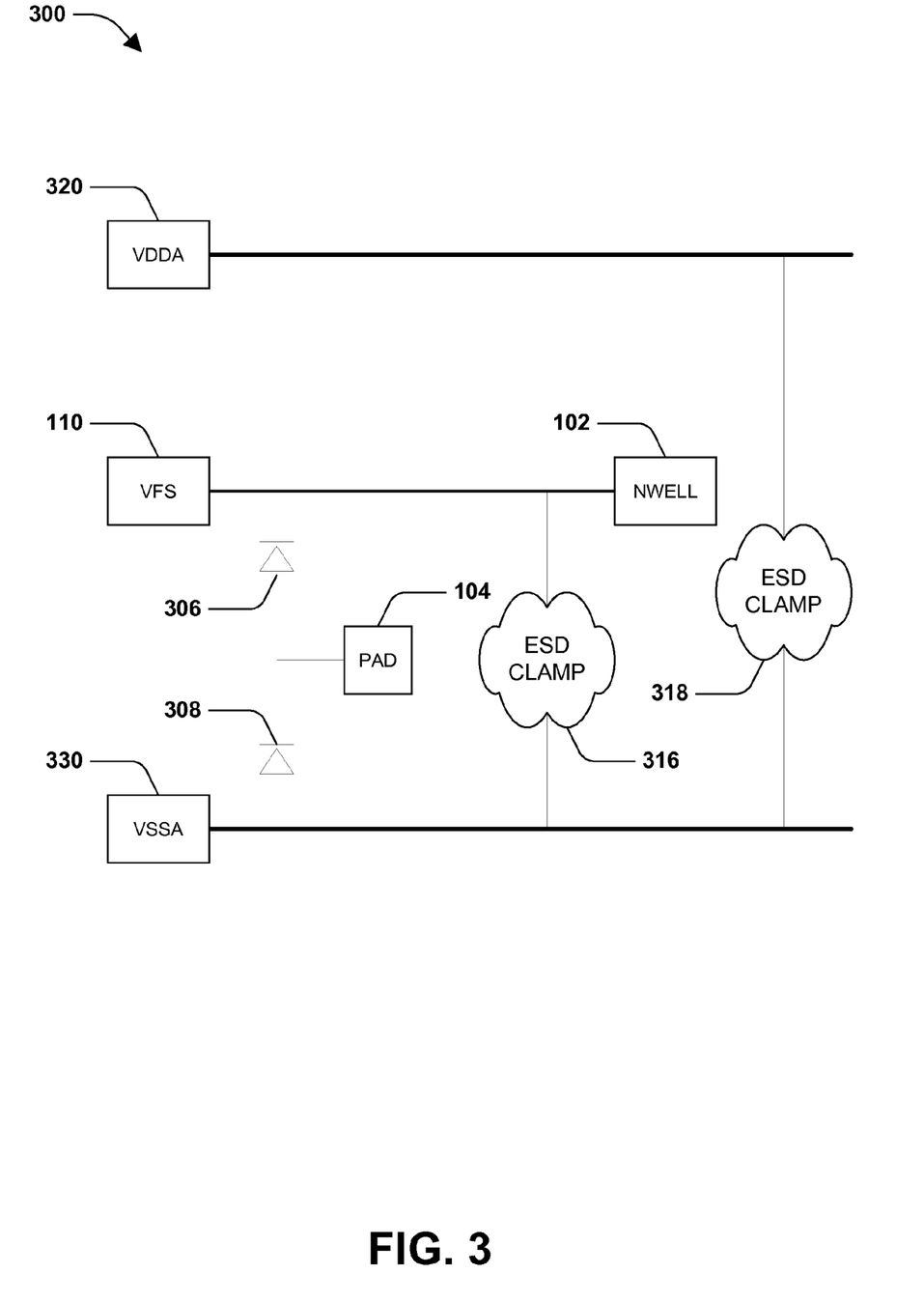
FIG. 3 is a schematic of an example failsafe ESD network.

FIG. 3 is a schematic of an example failsafe ESD network 300. In one embodiment, VFS 110 is connected to NWELL 102. For example, VFS 110 may be a supply voltage for NWELL 102 of a PMOS transistor (not shown). Accordingly, VFS may be utilized as a control mechanism for the PMOS transistor, for example. In one embodiment, turning the PMOS transistor on enables operation of a chip, while turning the PMOS transistor off disables operation of the chip such that leakage current is mitigated during the non-operational state of the chip, for example. In this example, NWELL 102 is connected to a negative supply voltage of a chip (e.g., Chip "A") VSSA 330 via ESD clamp 316. Additionally ESD clamp 318 is configured to clamp (e.g., separate) positive supply voltage of the chip (e.g., Chip "A") VDDA 320 from VSSA 330. For example, ESD clamps 316 and 318 are configured to facilitate discharge of ESD current from an ESD event, thus providing at least some ESD protection. According to one aspect, a first diode 306 is configured to connect PAD 104 to VFS 110, and a second diode 308 is configured to connect VSSA 330 to PAD 104. To this end, an ESD current path may flow through PAD 104, the first diode 306, VFS 110 and/or NWELL 102, and ESD clamp 316, in order to discharge to VSSA 330 (e.g., ground), for example.

In one embodiment, the first diode 306 comprises a first p-n junction, where a p-junction is connected to PAD 104, and an n-junction is connected to VFS 110 and/or NWELL 102. In another embodiment, the first p-n junction comprises a p-junction comprising a PMOS drain, and an n-junction comprising a PMOS transistor body. According to one aspect, the PMOS transistor comprises a pull-up PMOS driver, and a PMOS body capable of N+ diffusion, and a PMOS drain capable of P+ diffusion.

Turning to the second diode 308, according to one embodiment, the second diode 308 comprises a second p-n junction, where the second p-n junction comprises a p-junction connected to VSSA 330 and an n-junction connected to PAD 104. In another embodiment, the second p-n junction comprises a p-junction comprising an NMOS transistor body, and an n-junction comprising an NMOS drain. According to one aspect, the NMOS transistor body comprises a non-snapback NMOS transistor body and a non-snapback NMOS drain. According to another aspect, the NMOS transistor comprises a pull-down NMOS driver, and an NMOS body capable of P+ diffusion, and an NMOS drain capable of N+ diffusion. Accordingly, in one embodiment, VSSA 330 represents a positive voltage, while PAD 104 represents a negative voltage during an ESD event, for example. In this way, an example failsafe ESD network 300 is provided.

Figure 4:
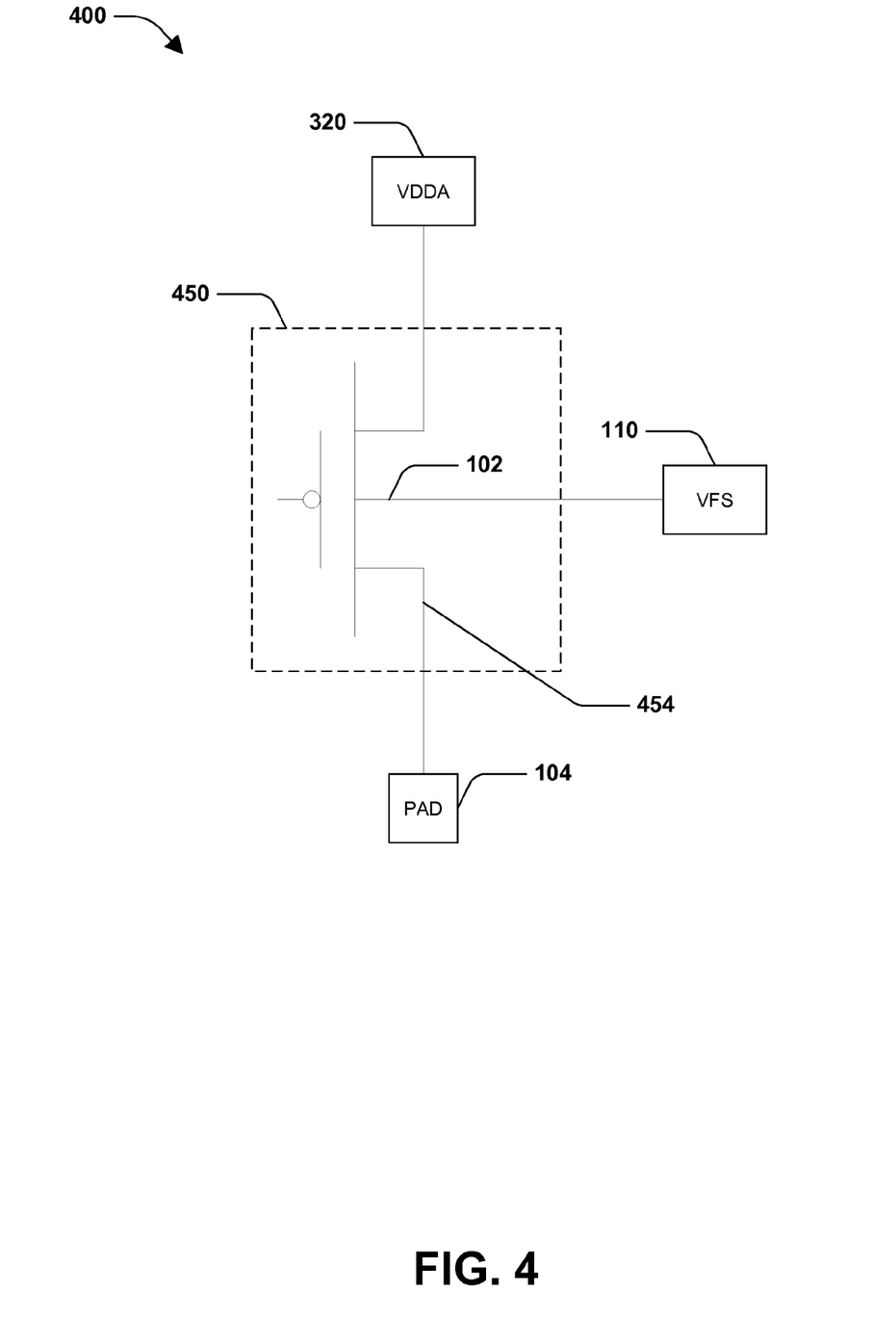
FIG. 4 is a schematic of an example failsafe ESD network.

According to one aspect, a PMOS transistor may comprise an NWELL body associated with failsafe ESD protection. For example, FIG. 4 illustrates a schematic of an example failsafe ESD network 400 comprising a PMOS transistor 450, for example. In one embodiment, VFS 110 is connected to the PMOS transistor 450 at NWELL body 102. In one embodiment, the PMOS transistor 450 comprises a source, a body 102, a gate, and a drain 454. For example, the body 102 of the PMOS transistor 450 may comprise an NWELL circuit interface 102. Additionally, a source of the PMOS transistor is connected to a positive supply voltage of a chip (e.g., Chip "A") VDDA 320 and a drain 454 of the PMOS transistor is connected to PAD of the chip (e.g., Chip "A") 104. To this end, ESD current sinking into the chip via PAD 104 is discharged through NWELL body 102 to VFS 110, for example. In one embodiment, PMOS transistor 450 may comprise and/or act as a first diode comprising a p-n junction, where a p-junction (e.g. comprising PMOS drain region 454) is connected to PAD 104, and an n-junction (e.g., comprising the PMOS body) is connected to VFS 110 and/or NWELL body 102.

According to one aspect, the PMOS transistor 450 may comprise a first diode, for example. The diode may be configured to connect PAD 104 to VFS 110, for example. According to another aspect, the PMOS transistor 450 may comprise a p-n junction, where the p-n junction comprises a p-junction and an n-junction. To this end, the p-junction comprises the PMOS drain and is connected to PAD 104 and the n-junction comprises NWELL 102 (e.g., the body of PMOS transistor 450) and is connected to VFS 110.

Figure 5:
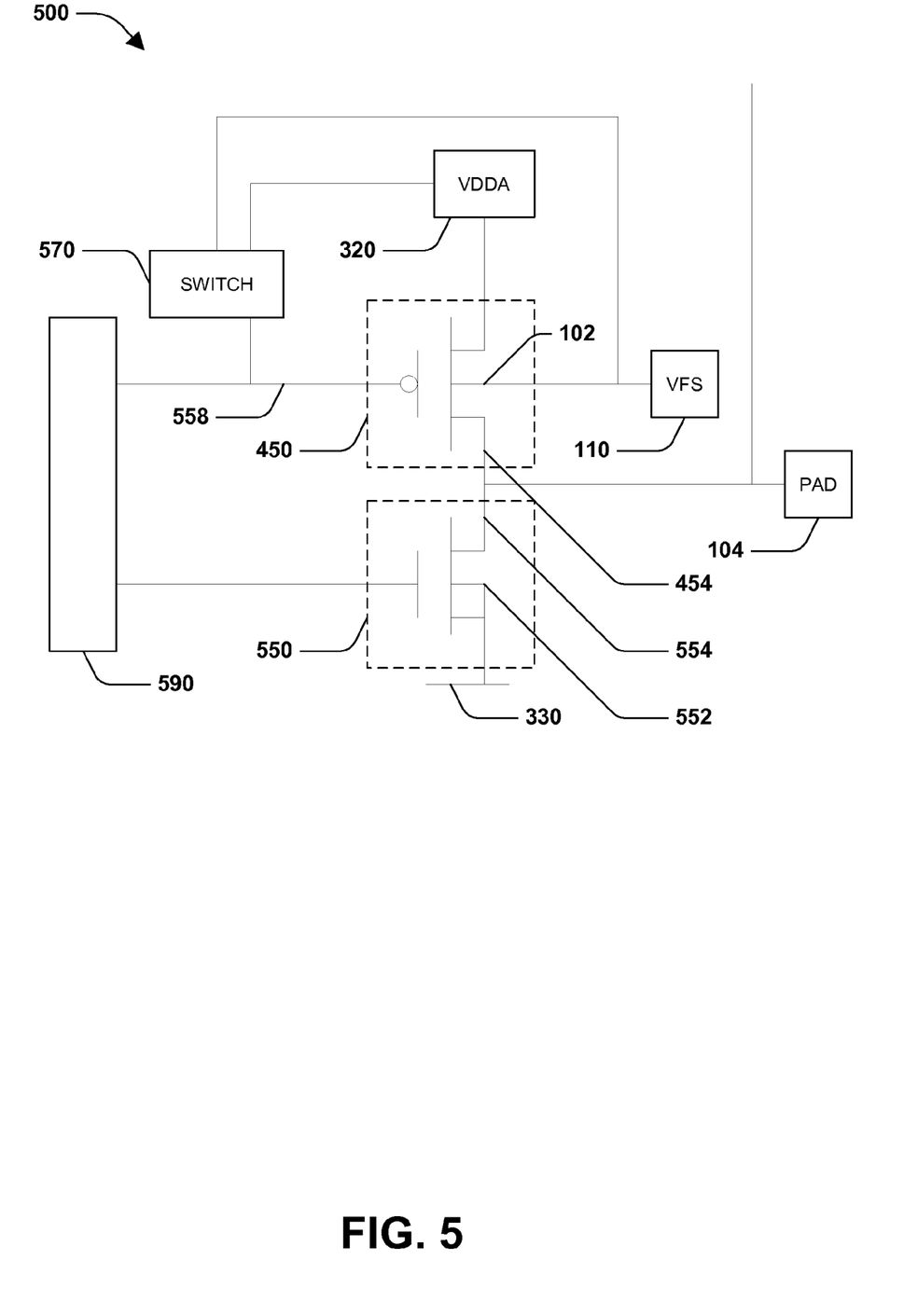
FIG. 5 is a schematic of an example failsafe ESD network.

One embodiment of an example failsafe ESD network 500 (e.g., comprised within a Chip "A") is illustrated in the schematic of FIG. 5. In this example, failsafe ESD network 500 comprises a PMOS transistor 450, an NMOS transistor 550, negative supply voltage of a chip (e.g., Chip "A") VSSA 330, positive supply voltage of the chip (e.g., Chip "A") VDDA 320, VFS 110, PAD 104, switch 570, pre-decoding circuit 590, and Node "G" 558. It will be appreciated that Node "G" 558 is connected to a gate portion of PMOS transistor 450 and that Node "G" may be biased based at least in part on switch 570 to influence operation of PMOS transistor 450. In one embodiment, PMOS transistor 450 comprises a PMOS gate (e.g., connected to Node "G" 558), a PMOS source, a PMOS transistor body (e.g., NWELL body 102), and a PMOS drain 454.

In one embodiment, NMOS transistor 550 comprises an NMOS gate, an NMOS source, an NMOS body 552, and an NMOS drain 554. According to one aspect, NMOS transistor 550 comprises a non-snapback NMOS transistor, a non-snapback transistor body, and a non-snapback NMOS drain. In this example, VFS 110 is connected to the NWELL body 102 of PMOS transistor 450. Additionally, a source of the PMOS transistor 450 is connected to VDDA 320, a gate of PMOS transistor is connected to Node "G" 558, and a drain 454 of the PMOS transistor is connected to PAD 104. In this embodiment, PAD 104 is connected to a drain 554 of the NMOS transistor 550, while the body 552 of NMOS transistor is connected to VSSA 330. In one embodiment, VSSA 330 comprises ground, and a source of NMOS transistor 550 is connected to VSSA 330. Pre-decoding circuit 590 is connected to a gate of NMOS transistor 550 and the gate of PMOS transistor 450 (e.g., at Node "G" 558).

According to one aspect, switch 570 (e.g., as will be described in further detail in FIG. 7 and FIG. 8) is configured to connect Node "G" 558 to at least one of PAD 104, VFS 110, and/or VDDA 320. It will be appreciated that the circuit of FIG. 5 is configured such that Node "G" 558 and/or the gate for PMOS transistor 450 enables and/or disables circuitry (e.g., not shown) for a chip (e.g., Chip "A"). For example, in one embodiment, if Node "G" 558 is biased high (e.g., by way of switch 570), PMOS transistor 450 is turned off, facilitating mitigation of leakage current flow into the chip. In another embodiment, if Node "G" 558 is biased low (e.g., via switch 570), PMOS transistor 450 is turned on, thus enabling the chip to operate. In one embodiment (e.g., where VDDA and PAD are inputs, and node "G" is an output), if VDDA is low and PAD is low, node "G" is a "don't care" output. Additionally, if VDDA is high and PAD is low or if VDDA is high and PAD is high, node "G" may similarly output a "don't care" output. However, if VDDA is low and PAD is high, node "G" is configured to output a high, thus disabling PMOS transistor 450, and thus chip (e.g., Chip "A") accordingly.

In another embodiment (e.g., where VDDA and VFS are inputs, and node "G" is an output), if VDDA is low and VFS is low or if VDDA is high and VFS is high, node "G" is a "don't care" output. In this example embodiment, if VDDA is low and VFS is high, node "G" is configured to output a high, thus shutting PMOS transistor 450 off, and mitigating leakage into the chip (e.g., Chip "A") as desired (e.g., without utilizing snapback NMOS transistors, for example). In this way, a failsafe ESD network 500 is provided.

Figure 6:
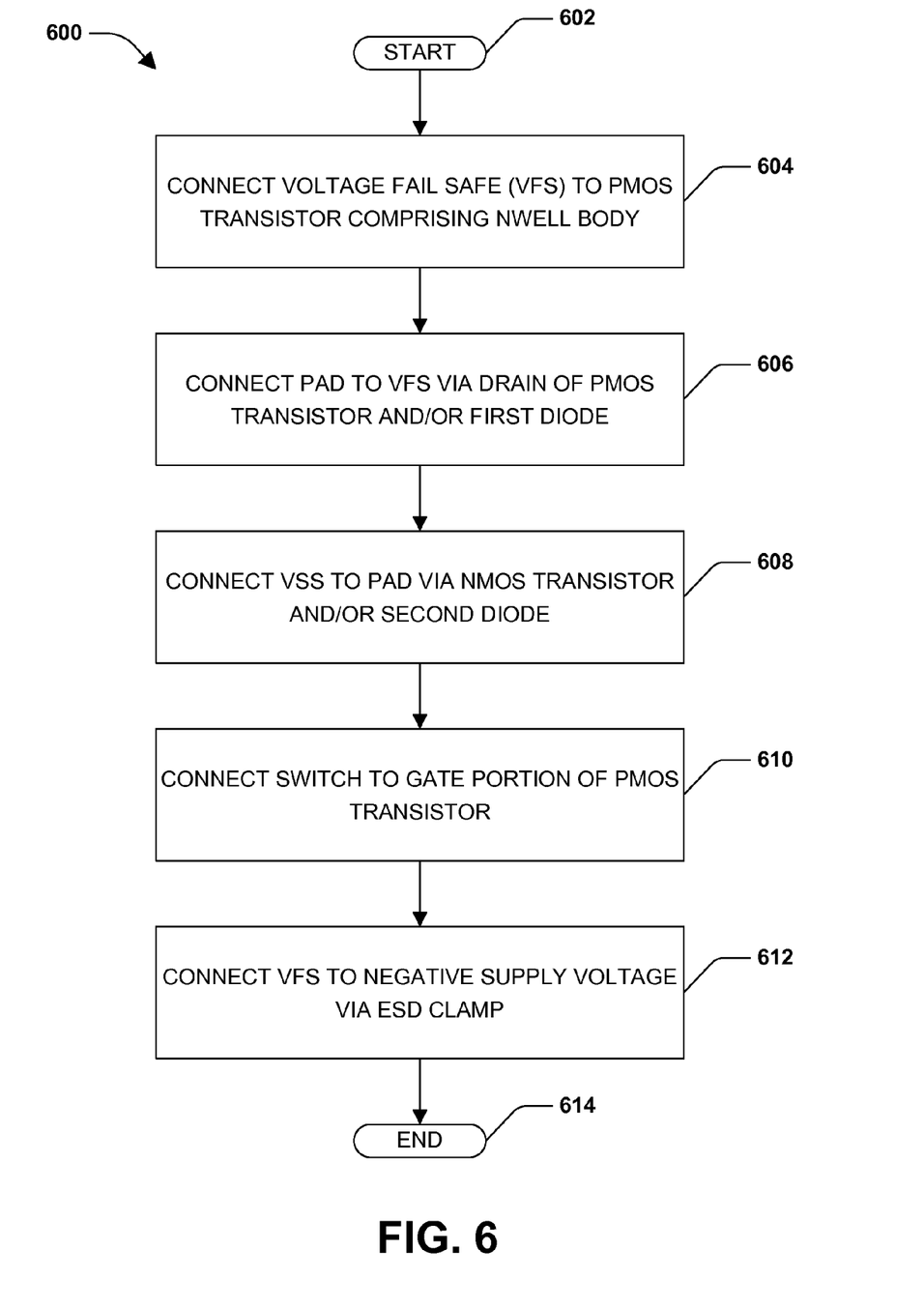
FIG. 6 is a flow diagram of an example method for providing failsafe ESD protection.

FIG. 6 illustrates a flow diagram of an example method for providing failsafe ESD protection. At 602, the method starts. At 604, a voltage fail safe (VFS) is connected to a PMOS transistor comprising an NWELL body. In one embodiment, the PMOS transistor comprises a PMOS drain, PMOS source, and a PMOS gate, for example. In another embodiment, the PMOS transistor comprises a p-n junction comprising a p-junction and an n-junction. In yet another embodiment, the p-junction comprises the PMOS drain and the n-junction comprises the PMOS body.

At 606, PAD is connected to VFS via a drain of the PMOS transistor and/or a first diode. In one embodiment, the PMOS transistor comprises the first diode. For example, the first diode may comprise the p-n junction where a p-junction is connected to PAD and an n-junction is connected to VFS and/or the NWELL body.

At 608, VSS is connected to PAD via an NMOS transistor and/or a second diode. In one embodiment, the NMOS transistor comprises a NMOS drain, NMOS source, and a NMOS gate, for example. In another embodiment, the NMOS transistor comprises a p-n junction comprising a p-junction and an n-junction. In yet another embodiment, the p-junction comprises the NMOS transistor body and the n-junction comprises the NMOS drain. According to one aspect, the NMOS transistor comprises the second diode. For example, the second diode may comprise the p-n junction where the p-junction is connected to VSSA and an n-junction is connected to PAD.

At 610, a switch is connected to a gate portion of the PMOS transistor. In one embodiment, the switch is configured to bias the gate of the PMOS transistor to control operation of the PMOS transistor (e.g., and thus, operation of a chip (e.g., Chip "A") comprising the PMOS transistor). For example, in one embodiment, the switch may bias the PMOS gate based at least in part on VDDA, PAD, VFS, and a Node "G". In another embodiment, the switch may bias the gate of the PMOS transistor based at least in part on VDDA, VFS, and Node "G", for example. In another embodiment, the gate of the PMOS transistor is biased high based at least in part on VFS high and VDDA low. That is, for example, VFS is high when the chip (e.g., Chip "A") is desired to be non-operational, and thus comprise a mitigated current sink from PAD. Further, VDDA is low when the chip (e.g., Chip "A") is desired to be non-operational at least because supply voltage is not required in a non-operational state. To this end, gate of PMOS transistor is thus biased high (e.g., turning Chip "A" off and/or mitigating leakage current) accordingly. Similarly, in another embodiment, the gate of the PMOS transistor is biased high (e.g., to turn Chip "A" off and/or mitigate leakage current flow into Chip "A") based at least in part on VFS high, VDDA low, and VDDB high. That is for example, leakage current is mitigated for the chip (e.g., Chip "A") when VFS is high for the chip (e.g., indicating that it is desired for Chip "A" to be non-operational), VDDA is low (e.g. indicating that no positive supply voltage is being supplied to Chip "A"), and VDDB is high (e.g., indicating that a positive supply voltage being supplied to Chip "B").

At 612, VFS is connected to a negative supply voltage for the chip (e.g., Chip "A") VSSA via an ESD clamp. In one embodiment, the ESD clamp is configured to protect against ESD surges from PAD by clamping voltage and enabling ESD current to be discharged to VSSA (e.g., which would otherwise be discharged to VFS, for example). At 614, the method 600 ends.

Figure 7:
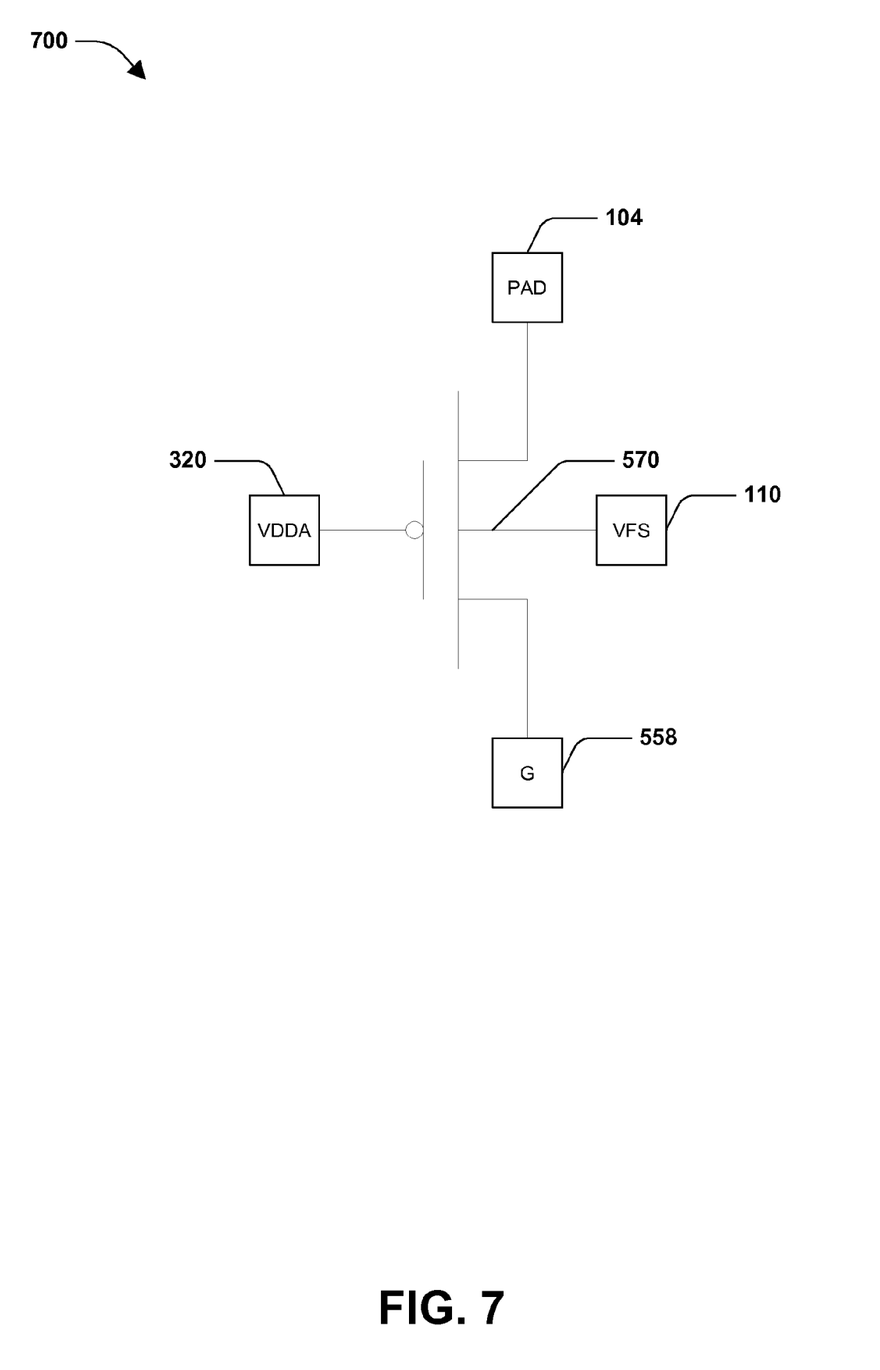
FIG. 7 is a schematic of an example switch configured to manage a failsafe ESD network.

FIG. 7 is an illustration of a schematic of an example switch 700 configured to manage a failsafe ESD network (e.g., where the switch, in one example, corresponds to the switch 570 in FIG. 5). In one embodiment, switch 700 is connected to a gate portion of a PMOS transistor comprising an NWELL body portion. In one embodiment, switch 700 is configured to output high based at least in part on VFS high and VDDA low. For example, switch 700 comprises a PMOS transistor comprising a gate, body, source, and drain. In one embodiment, a gate of the PMOS is connected to VDDA 320, a source of the PMOS is connected to PAD 104, a body 570 of the PMOS is connected to VFS 110, and a drain of the PMOS is connected to a Node "G" 558. It will be appreciated that switch 700 may be arranged in a variety of ways, so long as the output of switch 700 biases Node "G" 558 high to turn a chip (e.g., Chip "A") off and low in order to enable the chip (e.g., Chip "A").

Figure 8:
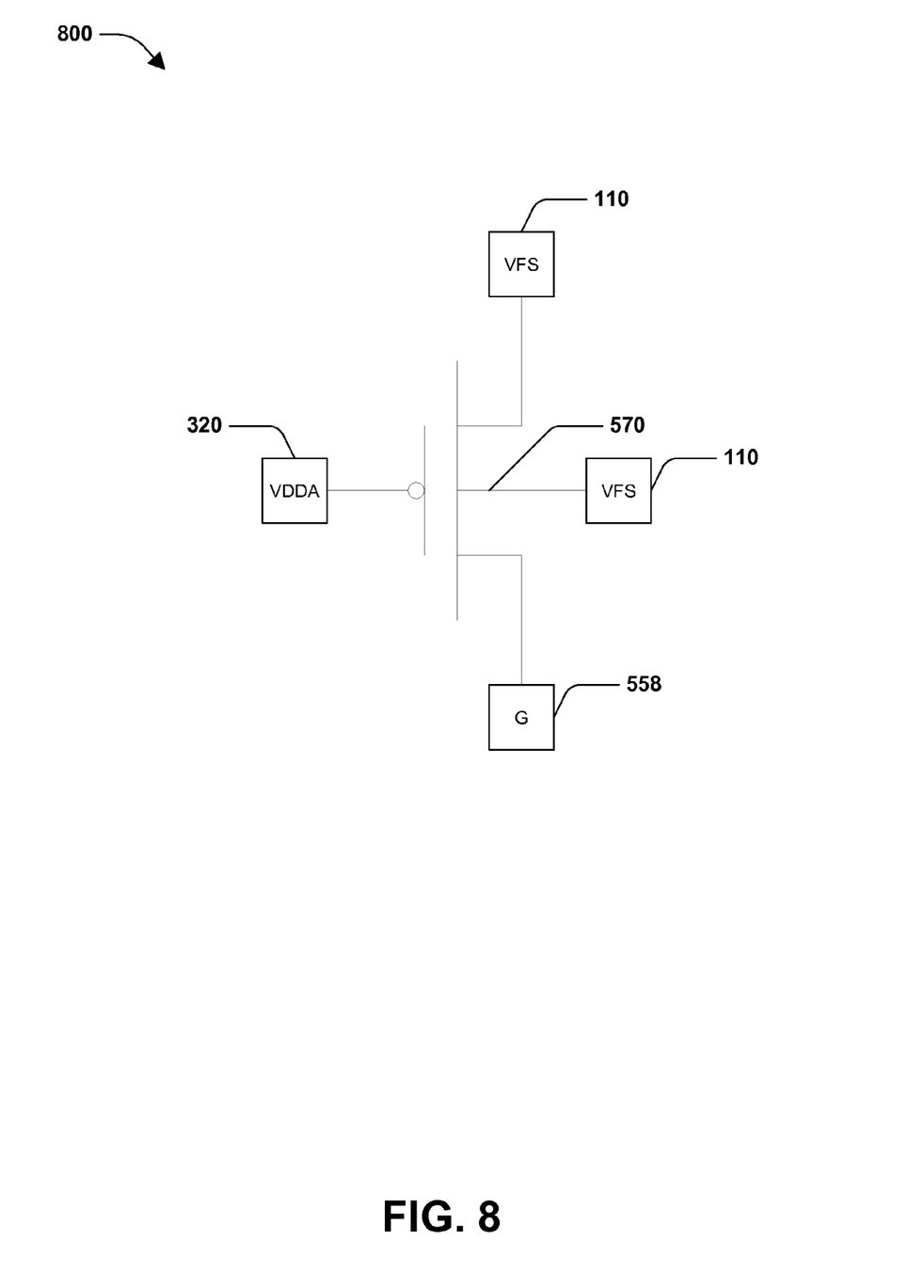
FIG. 8 is a schematic of an example switch configured to manage a failsafe ESD network.

According to another embodiment, FIG. 8 is an illustration of a schematic of an example switch 800 configured to manage a failsafe ESD network (e.g., where the switch, in one example, corresponds to the switch 570 in FIG. 5). In this example, switch 800 is connected to a gate portion of a PMOS transistor comprising an NWELL body portion. In one embodiment, switch 800 is configured to disable a PMOS based at least in part on VFS high and VDDA low. For example, switch 800 comprises a PMOS transistor comprising a gate, body, source, and drain. In one embodiment, a gate of the PMOS is connected to VDDA 320, a source of the PMOS is connected to VFS 110, a body 570 of the PMOS is connected to VFS 110, and a drain of the PMOS is connected to a Node "G" 558.

Figure 9:
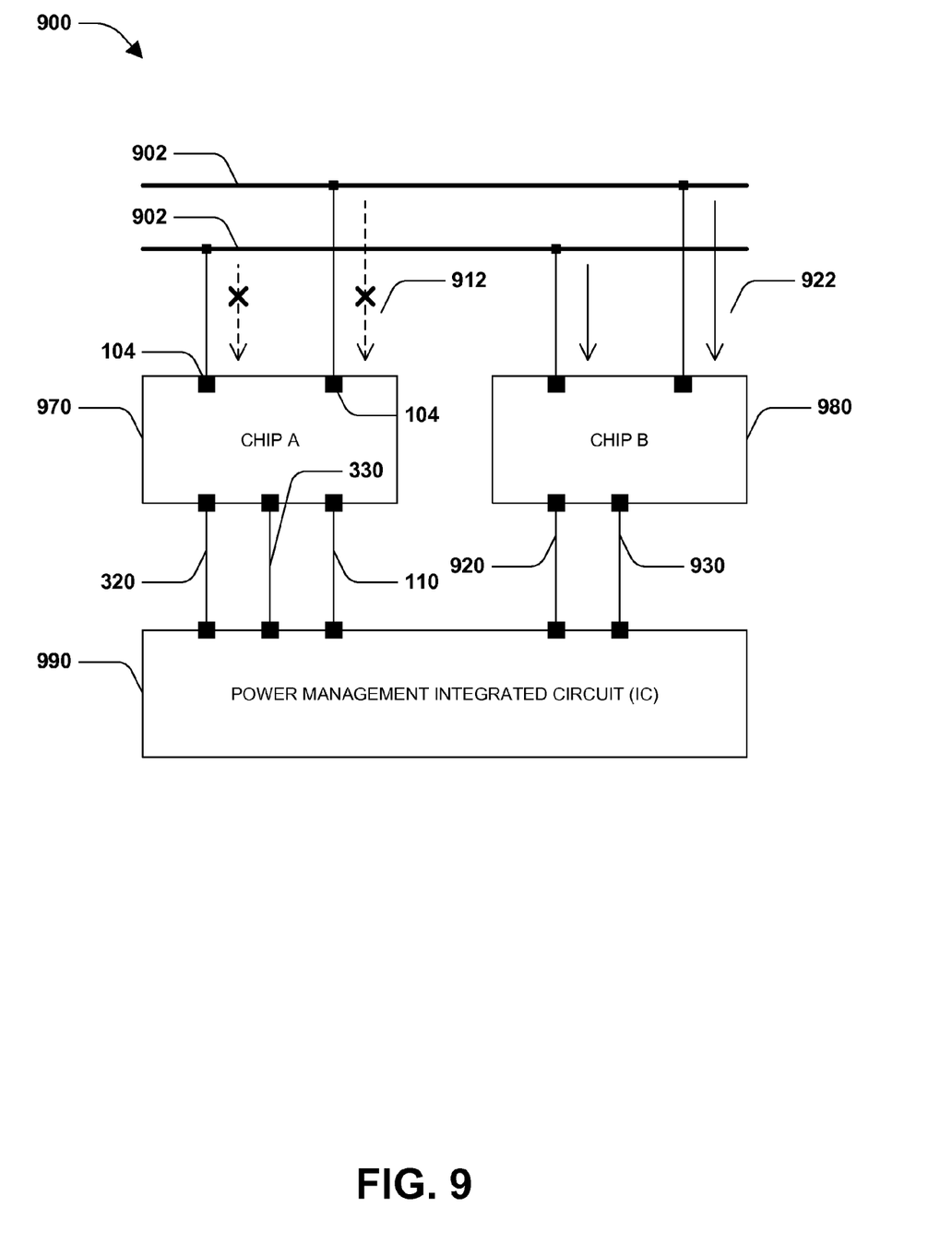
FIG. 9 is a schematic of an example power management integrated circuit (IC) configured to manage a failsafe ESD network.

FIG. 9 illustrates a schematic 900 of an example power management integrated circuit (IC) configured to manage a failsafe ESD network associated with device toggling. In this example, signal lines 902 carry data to be processed by Chip "A" 970 and Chip "B" 980. Chip "A" comprises pad(s) 104 configured to receive data from signal lines 902. In this example, Chip "A" 970 is toggled off in a manner such that no current 912 is desired to sink into Chip "A" 970. Chip "B" 980, on the other hand is togged on, and receiving data 922 (e.g., current sinking into Chip "B"). In this example, Chip "A" 970 comprises connections for a positive supply voltage VDDA 320, a negative supply voltage VSSA 330, and voltage fail safe (VFS) 110 (e.g., a supply voltage associated with an NWELL of Chip "A"). Additionally, Chip "B" 980 comprises connections for a positive supply voltage VDDB 920 and a negative supply voltage VSSB 930. Power management integrated circuit (IC) is configured to manage failsafe toggling of Chip "A" 970 and Chip "B" 980 via connections to VDDA 320, VSSA 330, VFS 110, VDDB 920, and VSSB 930. For example, in one embodiment, power management IC 990 manages the failsafe ESD network of Chip "A" by turning off a pull-up PMOS transistor for Chip "A" 970 in response to VDDA low, VDDB high, and VFS high. In another embodiment, power management IC 990 is configured to turn off the PMOS transistor for Chip "A" 970 based at least in part on VDDA low and VFS high. To this end, when the PMOS transistor for Chip "A" is turned off, Chip "A" is non-operational, and current leaking into Chip "A" (e.g., via PAD 104, for example) is mitigated.

According to one aspect, a method for providing failsafe ESD protection is provided, the method comprising connecting a voltage fail safe (VFS) to an NWELL circuit interface and connecting PAD to VFS, where PAD is operably connected to circuitry to be protected from ESD.

According to one aspect, a failsafe ESD network is provided, comprising a voltage fail safe (VFS), a PMOS transistor comprising an NWELL body connected to VFS, and PAD connected to a drain of the PMOS transistor, where PAD is operably connected to circuitry to be protected from ESD.

According to one aspect, a power management integrated circuit (IC) configured to manage a failsafe electrostatic discharge (ESD) network is provided. The IC comprises a voltage fail safe supply voltage (VFS) for a first device, where the VFS configured to supply voltage to an NWELL body of a pull-up PMOS transistor on the first device. The IC also comprises a positive supply voltage for the first device (VDDA), and a positive supply voltage for a second device (VDDB), the power management IC configured to turn off the pull-up PMOS transistor of the first device in response to at least one of VDDA low, VDDB high, and VFS high, or VDDA low and VFS high.

Although the subject matter has been described in language specific to structural features and/or methodological acts, it is to be understood that the subject matter of the appended claims is not necessarily limited to the specific features or acts described above. Rather, the specific features and acts described above are disclosed as example forms of implementing the claims.

Various operations of embodiments are provided herein. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to merely one of several implementations, such feature may be combined with one or more other features of the other implementations as may be desired and/or advantageous for any given or particular application. Furthermore, to the extent that "includes", "having", "has", "with", or variants thereof are used in either the detailed description or the claims, such terms are intended to be inclusive in a manner similar to the term "comprising."

What is claimed is:

1. A method for providing failsafe electrostatic discharge (ESD) protection, comprising:
   connecting a voltage source (VDDA) to a source of a transistor;
   connecting a voltage fail safe (VFS) supply voltage to an NWELL circuit interface of an NWELL body of the transistor; and
   connecting a PAD to the VFS supply voltage via a first diode, the PAD operably connected to circuitry to be protected from ESD.

2. The method of claim 1, the first diode forming a p-n junction, wherein:
   a p-junction of the p-n junction is connected to the PAD; and
   an n-junction of the p-n junction is connected to the VFS supply voltage.

3. The method of claim 1, comprising connecting the VFS supply voltage to a second voltage source (VSSA) via an ESD clamp.

4. The method of claim 1, comprising connecting a second voltage source (VSSA) to the PAD via a second diode.

5. The method of claim 1, comprising connecting a second voltage source (VSSA) to the PAD via a p-n junction comprising:
   connecting a p-junction of the p-n junction to the VSSA, the p-junction comprising a body of a second transistor; and
   connecting an n-junction of the p-n junction to the PAD, the n-junction comprising a drain of the second transistor, the transistor being a PMOS transistor and the second transistor being an NMOS transistor.

6. The method of claim 1, comprising connecting a switch to a gate of the transistor.

7. The method of claim 6, comprising setting the switch to high in response to at least one of:
receiving a low signal from the VDDA and receiving a high signal from the PAD; or
receiving a low signal from the VDDA and receiving a high signal from the VFS supply voltage.

8. The method of claim 6, connecting the switch to the gate of the transistor comprising connecting a second transistor to the gate comprising:
connecting the VDDA to a second gate of the second transistor;
connecting the PAD to a second source of the second transistor;
connecting the VFS supply voltage to a second body of the second transistor; and
connecting the gate of the transistor to a second drain of the second transistor.

9. The method of claim 6, connecting the switch to the gate-of the transistor comprising connecting a second transistor to the gate comprising:
connecting the VDDA to a second gate of the second transistor;
connecting the VFS supply voltage to a second source of the second transistor;
connecting the VFS supply voltage to a second body of the second transistor; and
connecting the gate of the transistor to a second drain of the second transistor.

10. The method of claim 1, comprising connecting the VFS supply voltage to a pull-up driver circuit.

11. The method of claim 1, the transistor being a PMOS transistor.

12. A failsafe electrostatic discharge (ESD) network, comprising:
a voltage fail safe (VFS) supply voltage;
a PMOS transistor comprising an NWELL body connected to the VFS supply voltage and a source connected to a voltage source (VDDA);
a PAD connected to a drain of the PMOS transistor, the PAD operably connected to circuitry to be protected from ESD; and
a switch configured to selectively couple the VFS supply voltage to a gate of the PMOS transistor.

13. The ESD network of claim 12, the PMOS transistor comprising a p-n junction configured to connect the PAD to the VFS supply voltage, the p-n junction comprising:
a p-junction formed at the drain; and
an n-junction formed at the NWELL body.

14. The ESD network of claim 12, comprising a first diode configured to connect the PAD to the VFS supply voltage.

15. The ESD network of claim 12, comprising a non-snapback NMOS transistor configured to connect a second voltage source (VSSA) to the PAD.

16. The ESD network of claim 15, the non-snapback NMOS transistor comprising a p-n junction comprising:
a p-junction formed at a non-snapback NMOS transistor body of the non-snapback NMOS transistor, the non-snapback NMOS transistor body connected to the VSSA; and
an n-junction formed at a non-snapback NMOS drain of the non-snapback NMOS transistor, the non-snapback NMOS drain connected to the PAD.

17. The ESD network of claim 12, comprising a second diode configured to connect a second voltage source (VSSA) to the PAD.

18. The ESD network of claim 12, comprising an ESD clamp configured to connect the VFS supply voltage to a second voltage source (VSSA).

19. A failsafe electrostatic discharge (ESD) network, comprising:
a voltage fail safe (VFS) supply voltage;
a PMOS transistor comprising an NWELL body connected to the VFS supply voltage and a source connected to a voltage source (VDDA);
a PAD connected to a drain of the PMOS transistor, the PAD operably connected to circuitry to be protected from ESD; and
a switch configured to selectively couple the PAD to a gate of the PMOS transistor.

20. A method for providing failsafe electrostatic discharge (ESD) protection, comprising:
connecting a voltage source (VDDA) to a source of a transistor;
connecting a voltage fail safe (VFS) supply voltage to an NWELL circuit interface of an NWELL body of the transistor;
connecting a PAD to the VFS supply voltage, the PAD operably connected to circuitry to be protected from ESD; and
connecting a second voltage source (VSSA) to the PAD via a second diode.

* * * * *